United States Patent [19]
Wilder, Jr.

[11] Patent Number: 5,526,635
[45] Date of Patent: Jun. 18, 1996

[54] LAWN MOWER INCLUDING IMPROVED BLADE CLUTCH AND BRAKE FEATURES

[75] Inventor: John W. Wilder, Jr., McDonough, Ga.

[73] Assignee: Snapper, Inc., McDonough, Ga.

[21] Appl. No.: 400,044

[22] Filed: Mar. 7, 1995

[51] Int. Cl.⁶ .................................................... A01D 34/76
[52] U.S. Cl. ........................................ 56/11.300; 56/11.6
[58] Field of Search .................................... 56/11.3, 11.6, 56/11.7, 11.8, 10.2 R, DIG. 4, DIG. 6, DIG. 15

[56] References Cited

U.S. PATENT DOCUMENTS

| | | | |
|---|---|---|---|
| 4,058,957 | 11/1977 | Roseberry | 56/11.3 |
| 4,300,332 | 11/1981 | Jackson | 56/11.3 |
| 4,307,558 | 12/1981 | Bent et al. | 56/11.3 |
| 4,409,779 | 10/1983 | Bent et al. | 56/11.3 |
| 4,813,215 | 3/1989 | Chase et al. | 56/11.3 X |
| 5,146,735 | 9/1992 | McDonner | 56/11.3 |
| 5,155,985 | 10/1992 | Oshima et al. | 56/11.3 X |

*Primary Examiner*—Terry Lee Melius
*Attorney, Agent, or Firm*—Jones & Askew

[57] ABSTRACT

A lawn mower including a cutting blade brake and clutch which discourages blade engagement after a predetermined level of blade brake wear, damage, or improper adjustment is encountered. Also provided is an improved idler pulley system providing an improved "serpentine" belt path therebetween.

8 Claims, 3 Drawing Sheets

LAWN MOWER INCLUDING IMPROVED BLADE CLUTCH AND BRAKE FEATURES

TECHNICAL FIELD

This invention relates in general to drive systems for lawn mowers or other powered vehicles, and particularly relates to a belt-driven lawn mower blade drive system including improved blade brake and clutch features.

BACKGROUND OF THE INVENTION

In the field of powered-driven vehicles such as lawn mowers, it is known to provide various belts and pulleys in order to transfer power from one rotating shaft, such as an engine drive shaft, to another rotating shaft, such as a shaft holding a grass cutting blade or other driven element. Examples in the prior art of such systems are as shown in U.S. Pat. Nos. 4,058,957, 4,300,332, 4,307,558, and 4,409,779.

In such systems, due to the preference for rubber or other elastomeric belts, some provision must be given for stretch or wear of the belts. If such a provision is not made, the belt may become loose or disengaged from its supporting pulleys. Furthermore, if the belt is to be selectively clutched and declutched by a drive pulley to provide selection power transfer through the belt, some provision can be made to allow selective slippage of the belt relative to the drive pulley. Finally, as brakes are often used in such configurations a need always exists to provide improved brake performance.

In reference to U.S. Pat. No. 4,058,957, it may be seen that a belt 27 is used to transfer power from a drive pulley 31 to a driven pulley 29, both rotating about substantially parallel axes which are fixed relative to the mower frame. An idler pulley 33 is pivotably attached relative to the mower frame, and provides the function of taking up slack in the belt caused by wear or heat, and also the. clutching function described above.

In reference to U.S. Pat. No. 4,300,332 assigned to McDonough Power Equipment, as may be seen, a driven blade pulley 30 is driven by a belt 32 which is driven by an unshown engine pulley. An idler pulley 34 provides the belt take-up and clutching function described above. A part of FIG. 1 is included in the present application as FIG. 6, denoted as "PRIOR ART".

In comparison, U.S. Pat. Nos. 4,307,358 and 4,409,779 disclose the use of a two-pulley design, in which a movable idler pulley 87 provide the take-up and clutching functions described above, with a second pulley having independently rotatable or "split" sheaves 35, 51, such that engagement of the belt causes the two sheaves 35, 51, to move together by being clutched by the belt 85.

Although some of the above-referenced prior art systems have advantages, shortcomings still exist, namely with respect to the ability of prior art systems to take up excessive slack in a belt, or to discourage further use of the clutching mechanism after a blade brake becomes unacceptably worn.

SUMMARY OF THE INVENTION

In summary, the present invention provides advantages over the known prior art in that a drive configuration is provided which automatically locks in a "blade declutched" position, if a certain amount of brake wear, damage, or improper adjustment is encountered. Furthermore, a pair of idler pulleys, positioned on opposing sides of the belt path, are provided which combine to create a "serpentine" belt path which is more efficient in taking up slack in the belt. Therefore, more belt stretching may be accommodated. Other advantages are discussed in the detailed discussion below.

Therefore, it is an object of the present invention to provide an improved riding or walk-behind lawn mower.

It is a further object of the present invention to provide a lawn mower having an improved blade clutch and brake system.

It is a further object of the present invention to provide a lawn mower having an improved blade clutch and brake system which is simple in operation.

It is a further object of the present invention to provide an improved blade clutch and brake mechanism which is simple in construction.

It is a further object of the present invention to provide an improved blade clutch and brake mechanism which is simple in maintenance.

It is a further object of the present invention to provide an improved blade clutch and brake mechanism which accommodates a greater degree of belt wear.

It is a further object of the present invention to provide an improved blade clutch and brake mechanism which accommodates a greater degree of belt stretching.

It is a further object of the present invention to provide an improved blade clutch and brake mechanism which restricts the operation of a blade clutch upon unacceptable brake wear.

Other objects, features, and advantages of the present invention will become apparent upon reading the following detailed description of the preferred embodiment of the invention when taken in conjunction with the drawing and the appended claims.

DETAILED DESCRIPTION OF THE PREFERRED EMBODIMENT

Figure 1:
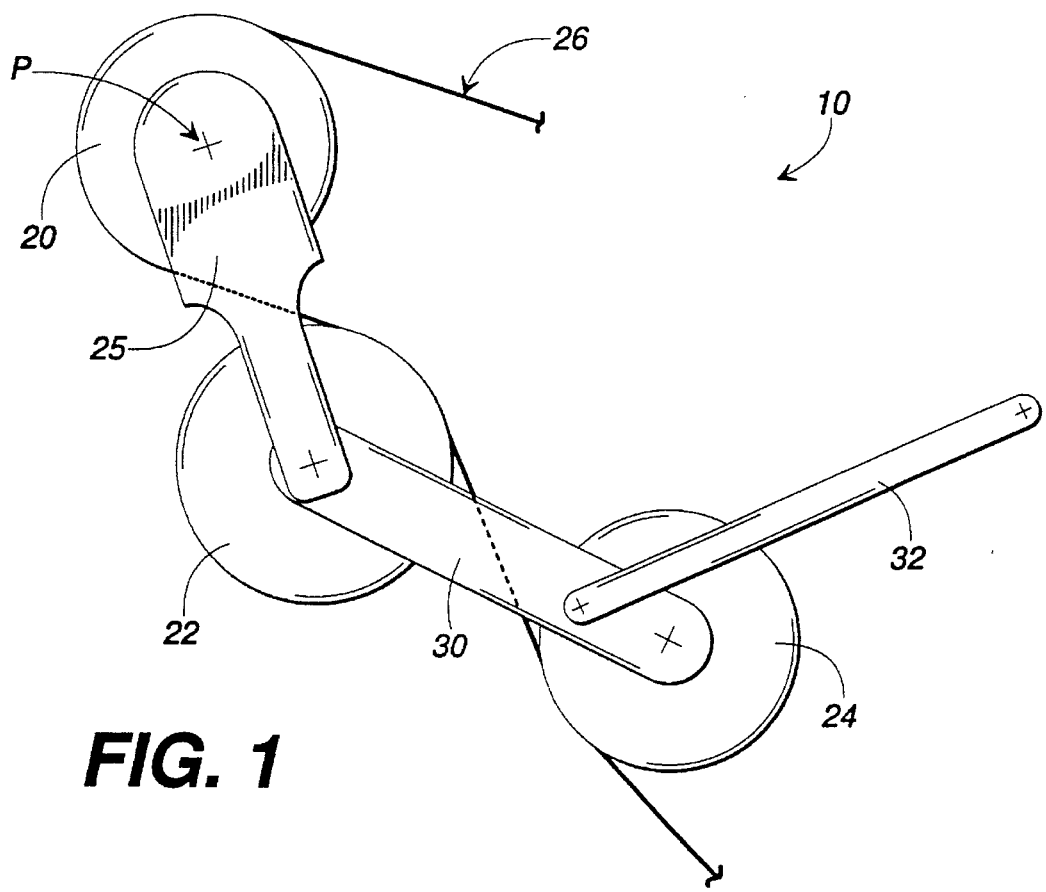
FIGS. 1–4 are top plan views illustrating the general operation of the blade brake and clutch assembly.

Reference is now made to FIGS. 1–5. As may be understood, this invention illustrates several top plan views of a blade brake/clutch system 10 which includes the use of four pulleys, a cutting blade pulley 20, a first idler pulley 22, a second idler pulley 24, and a drive or engine pulley (not shown), all of which define a continuous endless path for a belt 26. By movement of the idler pulleys, the belt 26 may selectively clutch or release (declutch) the belt to allow power to be transferred via the belt from an internal combustion or other suitable engine 40 (generally shown in FIG. 5) to a rotating cutting blade 42, which is attached to a vertical shaft along with the blade pulley. The vertical blade shaft is rotatably mounted relative to the cutting blade housing 44, which is suspended or otherwise attached relative to the frame of the mower 41 as known in the art.

Figure 6:
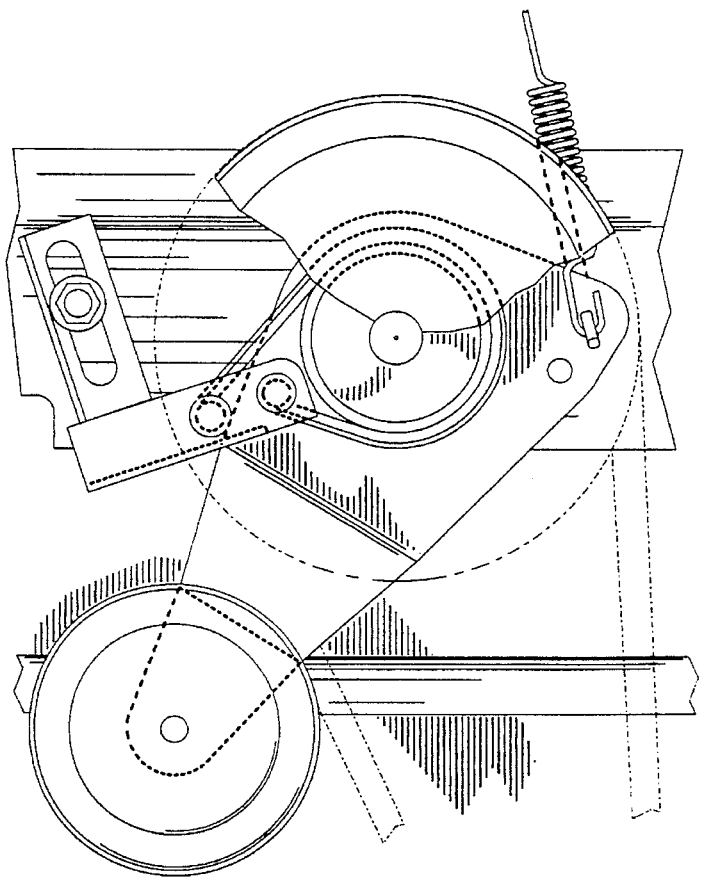
FIG. 6 is a top plan view (forward side up) of a prior art blade brake/clutch configuration according to the present invention. This is a part of a drawing in prior art U.S. Pat. No. 4,300,332, referenced below.

As in previous prior art systems such as shown in FIG. 6, the first idler pulley 22 is rotatably mounted to a brake bar 25, which is rotatably mounted about a fixed point "P", about which the blade pulley is also rotatably mounted. As the brake bar is rotated clockwise about point "P" (see particularly FIG. 4), the brake is applied by a brake band/drum configuration including a brake band 27 and a brake drum 28. The flexible brake band 27 has one end attached to a point stationary relative to point "P", and a second end attached to the brake band. As the brake bar 25 is pivoted about point "P" in direction "B", the brake is applied. Pivoting in the opposite direction releases the brake. However, unlike the known prior art, an additional idler pulley 24 is provided along with associated supporting linkages elements 30, 32. This additional pulley 24 provides a "serpentine" path for the belt as shown in FIG. 1, which as may be seen takes up more slack than a single-idler-pulley configuration shown in FIG. 5.

Figure 2:
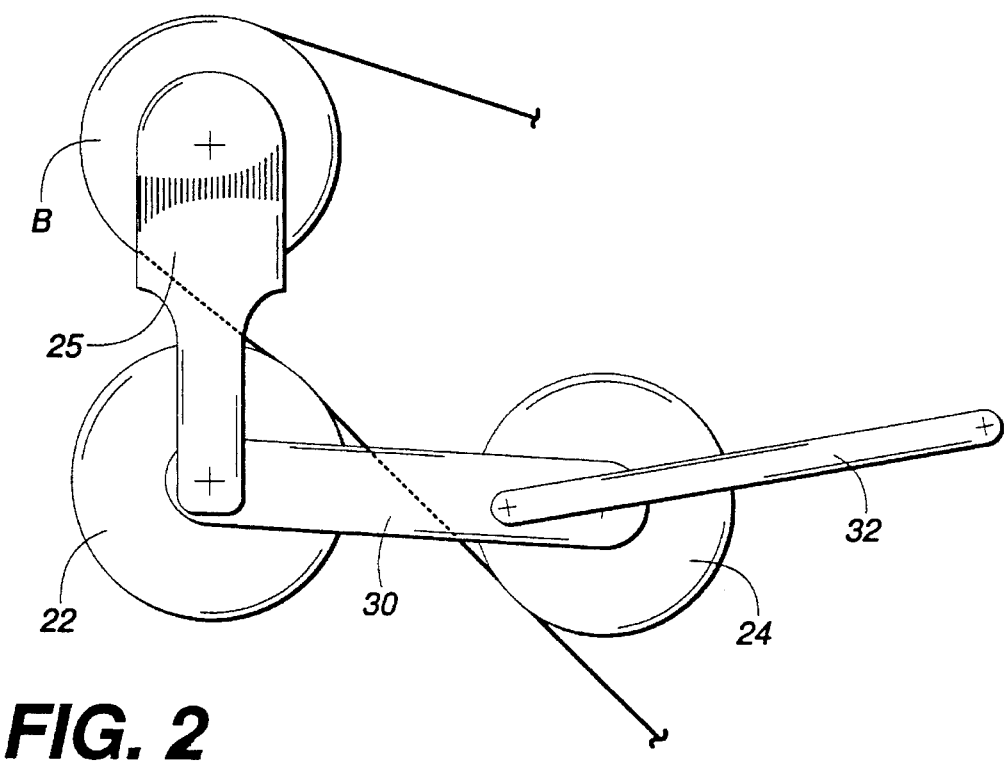
Figure 3:
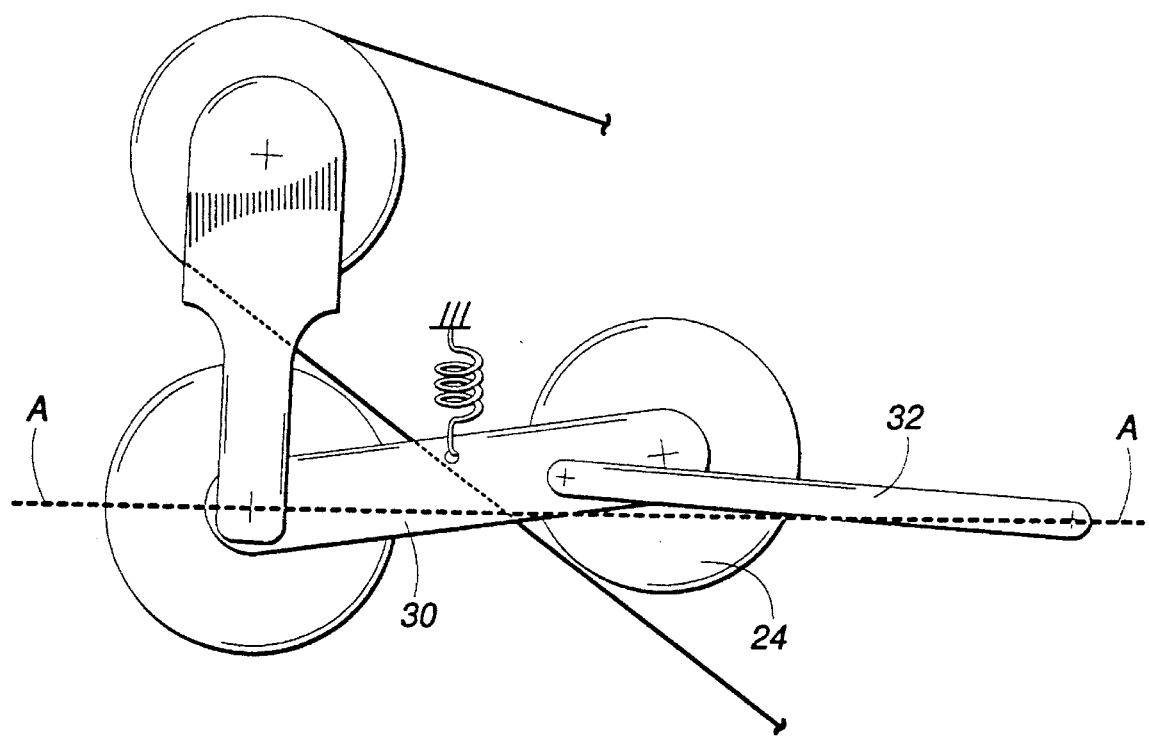
Figure 4:
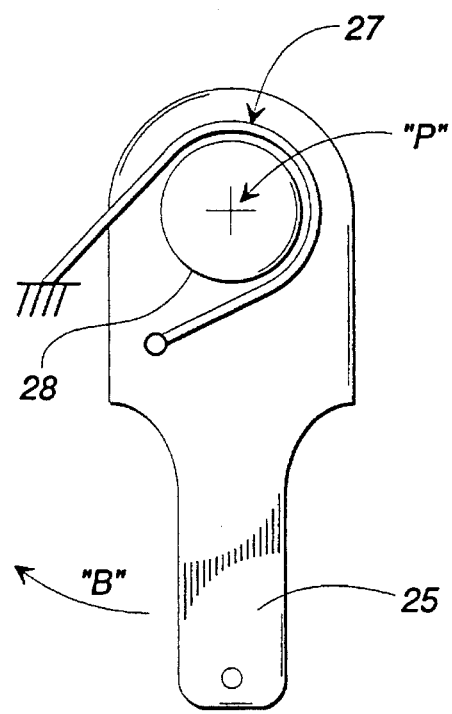
Figure 5:
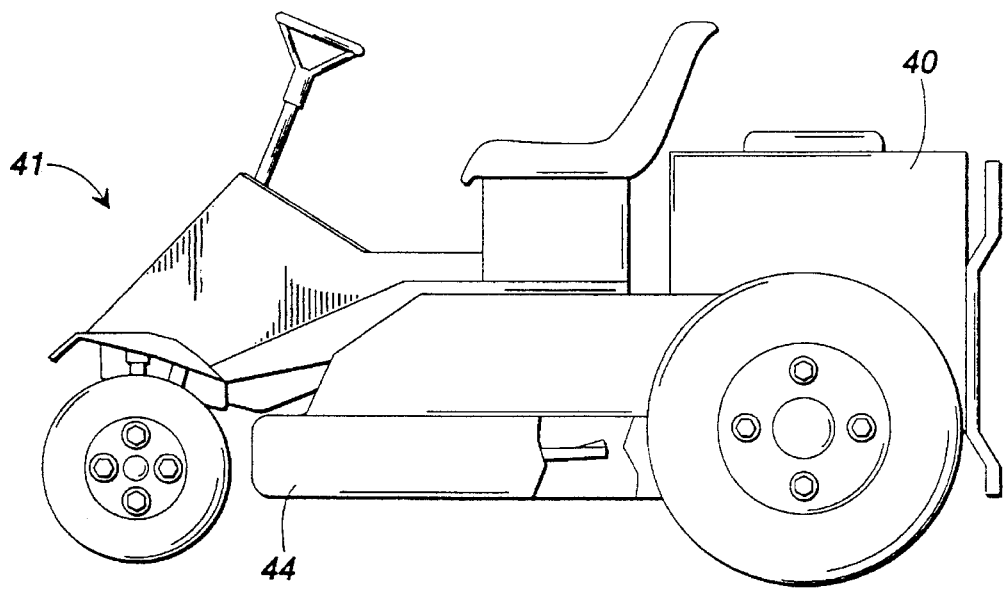
FIG. 5 is a side elevational view of a riding mower according to the present invention, although a walk-behind mower may also be used under the present invention.

The pair of linkage elements, a pivot bar 30 and a link rod 32 provide a novel clutch lock-out feature due to the "jackknife" configuration illustrated especially in FIGS. 2 and 3.

As may be seen, if the brake bar 25 is allowed to travel excessively clockwise during the braking mode, the linkages will "lock" into the configuration of FIG. 3, with the assistance of a lock spring 33 or other suitable device. At this point they can be manually unlocked if so desired, but they cannot be unlocked by simply attempting to clutch the belt. Excessive clockwise movement of the brake bar may be caused by brake wear, brake failure, or improper brake adjustment.

In particular reference to FIGS. 1–3, it may be seen that the (floating) pivot point between the pivot bar 30 and the link rod is spaced apart or "offset" relative to the rotational axis of the second idler pulley 24 as it rotates relative to the pivot bar 30. This offset may be varied as needed to provide a different mechanical advantage as desired.

As may be seen, the present invention provides improvements over the prior art by providing an improved lawn mower cutting blade brake and clutch system which discourages use of the cutting blade if the brake is improperly operating, and provides improved belt path characteristics allowing for improved belt slack take-up cause by belt wear stretch.

While this invention has been described in specific detail with reference to the disclosed embodiments, it will be understood that many variations and modifications may be effected within the spirit and scope of the invention as described in the appended claims.

What is claimed is:

1. A lawn mower cutting blade brake and clutch, comprising:

a cutting blade belt clutch moveable from a declutched to a clutched position;

a blade brake moveable within a range from an unbraked to a preferred brake position and further to an unpreferred brake position responsive to movement of said belt clutch from said clutched to said unclutched position; and a clutch lock for locking said belt clutch in said declutched position responsive to the movement of said blade brake to said unpreferred brake position facilitated by a predetermined level of wear encountered by said blade brake.

2. The lawn mower as claimed in claim 1, wherein said clutch lock cutting blade brake and clutch is provided by a pair of linkages which lock in a jackknife manner responsive to said blade brake being placed in said unpreferred brake position after said brake has reached said predetermined level of wear.

3. The lawn mower cutting blade brake and clutch as claimed in claim 1, wherein said blade comprises a blade brake band, a brake drum fixed relative to said blade band, and a brake bar movable from said unbraked position to said unpreferred brake position responsive to said brake band wearing to a thinner, unpreferred, configuration, said brake bar being lockable to its braked position by said clutch lock.

4. A lawn mower, comprising;

a frame;

a driving pulley rotatably mounted relative to said frame;

an engine rotatably powering said driving pulley;

a cutting blade shaft rotatably mounted relative to said frame;

a driven pulley attached to said cutting blade shaft;

a blade drive belt passing over said driving pulley and said driven pulley for facilitating power transfer from said engine to said cutting blade shaft;

brake means for braking said cutting blade shaft; and clutch means for providing selective clutching and declutching of said belt by said pulleys such that said power transfer may be correspondingly selectively engaged and disengaged; and clutch lock means for locking said clutch in said declutched position responsive to the movement of said brake means to an unpreferred brake position facilitated by a predetermined level of brake wear.

5. A lawn mower, comprising;

a frame;

a driving pulley rotatably mounted relative to said frame;

an engine rotatably powering said driving pulley;

a cutting blade shaft rotatably mounted relative to said frame;

a driven pulley attached to said cutting blade shaft;

a blade drive belt passing over said driving pulley and said driven pulley for facilitating power transfer from said engine to said cutting blade shaft;

brake means for braking said cutting blade shaft; and clutch means for providing selective clutching and declutching of said belt by said pulleys such that said power transfer may be correspondingly selectively engaged and disengaged, said clutch means comprising at least two idler pulleys rotatably mounted relative to a common link member and positioned on opposing sides of said belt path and moving in substantially opposite directions when being engaged with said belt.

6. A lawn mower as claimed in claim 5, wherein said clutch means further comprises a pair of linkages which combine to support said first and second idler pulleys.

7. A lawn mower as claimed in claim 5, further comprising clutch lock means for locking said clutch in said declutched position responsive to the movement of said brake means to an unpreferred braked position facilitated by a predetermined level of brake wear.

8. A lawn mower as claimed in claim 6, further comprising clutch lock means for locking said clutch in said declutched position responsive to the movement of said brake means to an unpreferred braked position facilitated by a predetermined level of brake wear.

* * * * *